US011414591B2

United States Patent
Farmer et al.

(10) Patent No.: US 11,414,591 B2
(45) Date of Patent: Aug. 16, 2022

(54) MICROBIAL PRODUCTS AND USES THEREOF TO IMPROVE OIL RECOVERY

(71) Applicant: Locus Oil IP Company, LLC, Solon, OH (US)

(72) Inventors: Sean Farmer, North Miami Beach, FL (US); Ken Alibek, Solon, OH (US); Sharmistha Mazumder, Copley, OH (US); Kent Adams, Twinsburg, OH (US); Tyler Dixon, Kent, OH (US); Yajie Chen, Solon, OH (US); Maja Milovanovic, North Royalton, OH (US)

(73) Assignee: LOCUS OIL IP COMPANY, LLC, Solon, OH (US)

( * ) Notice: Subject to any disclaimer, the term of this patent is extended or adjusted under 35 U.S.C. 154(b) by 0 days.

(21) Appl. No.: 16/490,187

(22) PCT Filed: Apr. 9, 2018

(86) PCT No.: PCT/US2018/026724
§ 371 (c)(1),
(2) Date: Aug. 30, 2019

(87) PCT Pub. No.: WO2018/191172
PCT Pub. Date: Oct. 18, 2018

(65) Prior Publication Data
US 2020/0071600 A1     Mar. 5, 2020

Related U.S. Application Data

(60) Provisional application No. 62/483,425, filed on Apr. 9, 2017.

(51) Int. Cl.
*C09K 8/584* (2006.01)
*C09K 8/588* (2006.01)
*C09K 8/582* (2006.01)

(52) U.S. Cl.
CPC .............. *C09K 8/582* (2013.01); *C09K 8/584* (2013.01); *C09K 8/588* (2013.01)

(58) Field of Classification Search
CPC ......... C09K 8/582; C09K 8/584; C09K 8/588
See application file for complete search history.

(56) References Cited

U.S. PATENT DOCUMENTS

| | | | |
|---|---|---|---|
| 3,871,956 A | 3/1975 | Azarowics | |
| 4,522,261 A | 6/1985 | McInerney et al. | |
| 4,905,761 A | 3/1990 | Bryant | |
| 5,165,477 A | 11/1992 | Shell et al. | |
| 7,681,638 B2 | 3/2010 | Soni et al. | |
| 9,422,470 B2 | 8/2016 | Xu et al. | |
| 9,550,937 B2 | 1/2017 | Campbell et al. | |
| 9,683,164 B2 | 6/2017 | Gunawan et al. | |
| 9,725,986 B2 | 8/2017 | Xu et al. | |
| 9,884,986 B2 | 2/2018 | Gunawan et al. | |
| 10,023,787 B2 | 7/2018 | Benoit et al. | |
| 10,190,038 B2 | 1/2019 | Armstrong et al. | |
| 2008/0167445 A1* | 7/2008 | Podella | C09K 8/582 530/350 |
| 2008/0302531 A1* | 12/2008 | Berger | C09K 8/584 166/270.1 |
| 2009/0029879 A1 | 1/2009 | Soni et al. | |
| 2010/0044031 A1 | 2/2010 | Fallon et al. | |
| 2011/0044972 A1 | 2/2011 | Fieldhouse et al. | |
| 2011/0059873 A1* | 3/2011 | Weerasooriya | C09K 8/584 507/225 |
| 2012/0122740 A1 | 5/2012 | Roldan Carrillo et al. | |
| 2012/0292022 A1 | 11/2012 | Choban et al. | |
| 2013/0062053 A1 | 3/2013 | Kohr et al. | |
| 2013/0324406 A1 | 12/2013 | Chisholm et al. | |
| 2014/0273150 A1 | 9/2014 | Angel | |
| 2014/0305649 A1 | 10/2014 | Tang et al. | |
| 2014/0315765 A1 | 10/2014 | McDaniel | |
| 2015/0037302 A1 | 2/2015 | Bralkowski et al. | |

(Continued)

FOREIGN PATENT DOCUMENTS

| | | |
|---|---|---|
| CN | 1272587 A | 11/2000 |
| CN | 102352227 A | 2/2012 |

(Continued)

OTHER PUBLICATIONS

"Production of sophorolipids by the yeast Candida bombicola using simple and low cost fermentative media", Daverey, et al., Food Research International, May 2009, 42(4), 499-504 (Year: 2009).*
Amani, H., et al., "Comparative study of biosurfactant producing bacteria in MEOR applications." Journal of Petroleum Science and Engineering. 2010, 75: 209-214.
De Almeida, D., et al., "Biosurfactants: Promising Molecules for Petroleum Biotechnology Advances." Frontiers in Microbiology, Oct. 2016, 7(1718): 1-14.
De Brito, D., Biosurfactants from renewable raw materials, Universidade do Minho Departamento de Engenharia Biológica, Nov. 2013, pp. 1-93.

(Continued)

*Primary Examiner* — Aiqun Li
(74) *Attorney, Agent, or Firm* — Saliwanchik, Lloyd & Eisenschenk

(57) ABSTRACT

This invention relates to compositions and methods of microbial enhanced oil recovery using biochemical-producing microbes. In specific embodiments, the methods of the subject invention comprise applying a bio surfactant-producing bacteria and/or a growth by-product thereof to an oil-producing site. In preferred embodiments, the bacteria is a strain of *Bacillus* in spore form. In some embodiments, the methods further comprise applying the bacteria with a yeast fermentation product, an alkaline compound, a polymer, a non-biological surfactant, and/or one or more chelating agents. Advantageously, the subject invention can be useful for stimulating the flow of oil from a well, as well as dissolving scale present in an oil-bearing formation.

7 Claims, No Drawings

(56) References Cited

U.S. PATENT DOCUMENTS

| | | | |
|---|---|---|---|
| 2015/0045290 | A1 | 2/2015 | Coutte et al. |
| 2016/0145487 | A1 | 5/2016 | Alam et al. |
| 2016/0160111 | A1 | 6/2016 | Smith et al. |
| 2016/0222280 | A1 | 8/2016 | Kohr et al. |
| 2016/0251565 | A1 | 9/2016 | Yanagisawa et al. |
| 2019/0241917 | A1 | 8/2019 | Winterburn et al. |

FOREIGN PATENT DOCUMENTS

| | | | |
|---|---|---|---|
| CN | 102762688 | A | 10/2012 |
| CN | 105753283 | A | 7/2016 |
| EA | 201991437 | A1 | 11/2019 |
| EP | 0540074 | A1 | 5/1993 |
| WO | 2007129332 | A1 | 11/2007 |
| WO | 2017040903 | A1 | 3/2017 |
| WO | 2017044953 | A1 | 3/2017 |
| WO | 2018049182 | A2 | 3/2018 |
| WO | 2018107162 | A1 | 6/2018 |

OTHER PUBLICATIONS

De Oliveira, M., et al., "Review: Sophorolipids A Promising Biosurfactant and it's Applications." International Journal of Advanced Biotechnology and Research, 2015, 6(2): 161-174.

Elshafie, A. E., et al., "Sophorolipids Production by Candida bombicola ATCC 22214 and its Potential Application in Microbial Enhanced Oil Recovery." Frontiers in Microbiology, Nov. 2015, 6(1324): 1-11.

El-Sheshtawy, H.S., et al., "Production of biosurfactants by Bacillus licheniformis and Candida albicans for application in microbial enhanced oil recovery." Egyptian Journal of Petroleum, 2016, 25: 293-298.

Ghojavand, H. et al., "Isolation of thermotolerant, halotolerant, facultative biosurfactant-producing bacteria." Appl. Microbiol. Biotechnol, Oct. 2008, 80(6): Abstract, doi: 10,1007/s00253-008-1570-7.

Gudina, E., et al., "Biosurfactant-producing and oil-degrading Bacillus subtilis strains enhance oil recovery in laboratory sand-pack columns." Journal of Hazardous Materials, 2013, 261: 106-113.

Kurtzman, C.P., et al., "Production of sophorolipid biosurfactants by multiple species of the *Starmerella* (Candida) bombicolayeast clade." FEMS Microbiol Lett, 2010, 311: 140-146.

Morikawa, M., "Beneficial Biofilm Formation by Industrial Bacteria Bacillus subtilis and Related Species." Journal of Bioscience and Bioengineering, 2006, 101(1): 1-8.

Nitschke, M., et al., "Production and properties of a surfactant obtained from Bacillus subtilis grown on cassava wastewater." Bioresource Technology, 2006, 97: 336-341.

Nur, H.A., et al., "*Saccharomyces cerevisiae* from Baker's Yeast for Lower Oil Viscosity and Beneficial Metabolite to Improve Oil Recovery: An Overview." Applied Mechanics and Materials, 2014, 625: 522-525.

Pacwa-Plociniczak, M. et al., "Review: Environmental Applications of Biosurfactants: Recent Advances." Int. J. Mol. Sci., 2011, 12: 633-654.

Rocha E Silva, F.C.P., et al., "Yeasts and bacterial biosurfactants as demulsifiers for petroleum derivative in seawater emulsions." AMB Expr., 2007, 7(202): 1-13.

Santos, D.K.F., et al., "Biosurfactants: Multifunctional Biomolecules of the 21st Century." International Journal of Molecular Sciences, 2016, 17(401): 1-31.

Sen, R., "Biosurfactants: Advances in Experimental Medicine and Biology." Landes Bioscience and Springer Science+Business Media, LLC, 2010, 672: 1-331.

Sharma, A. et al., "A study on biosurfactant production in Lactobacillus and *Bacillus* sp." Int. J. Curr. Microbiol. App. Sci., 2014, 3(11): 723-733.

Silva, R., et al., "Applications of Biosurfactants in the Petroleum Industry and the Remediation of Oil Spills." International Journal of Molecular Sciences, 2014, 15: 12523-12542.

Takahashi, M., et al., "Production of Sophorolipid Glycolipid Biosurfactants from Sugarcane Molasses Using Starmerella bombicola NBRC 10243." Journal of Oleo Science, 2011, 60(5): 267-2733.

Thaniyavarn, J., et al., "Production of Sophorolipid Biosurfactant by Pichia anomala." Bioscience, Biotechnology, and Biochemistry, 2008, 72(8): 2061-2068.

* cited by examiner

MICROBIAL PRODUCTS AND USES THEREOF TO IMPROVE OIL RECOVERY

CROSS-REFERENCE TO RELATED APPLICATION

This application is a National Stage Application of International Application No. PCT/US2018/026724, filed Apr. 9, 2018; which claims the benefit of U.S. provisional application Ser. No. 62/483,425, filed Apr. 9, 2017, both of which are incorporated herein by reference in their entirety.

BACKGROUND OF THE INVENTION

The high demand for fossil fuels necessitates efficient production of oil. As oil wells mature, it becomes more difficult and costly to continue to pump oil at an economically viable rate. Therefore, there is a need to develop improved methods of oil recovery. One such mechanism utilizes microbes and their by-products.

Oil exists in small pores and narrow fissures within the body of reservoir rocks underneath the surface of the earth. Natural pressure of the reservoir causes the oil to flow up to the surface, thereby providing primary production; however as oil production progresses, the reservoir pressure is depleted to a point at which artificial lift or pumping is required to maintain an economical oil production rate.

When it is necessary to provide external energy for the reservoir to achieve additional oil recovery (secondary recovery), the extra energy can be introduced by injecting gas (gas injection) and/or water (water flooding). After some years of operation in a field, the injected fluids flow preferentially along high permeable layers that cause these fluids to by-pass oil saturated areas in the reservoir. Therefore, an increasing quantity of water (or gas) rises with the oil and, by decreasing the ratio of oil to water, eventually it becomes uneconomical to continue the process; at that time the field must be abandoned.

Primary recovery generally results in an average recovery of only a fraction of the oil originally present in an oil bearing formation. Secondary recovery, e.g., water flooding, generally recovers another 10% by the time it becomes uneconomical to continue. It is not unusual for 60 to 70% of the oil originally in the formation to remain, even after secondary recovery reaches is economical limit. In this situation, a third stage of oil recovery, so-called tertiary production, can be considered.

At this tertiary stage, technically advanced methods are employed to either modify the properties of reservoir fluids or the reservoir rock characteristics. In general, the methods can be classified into four main categories: thermal methods, chemical methods, miscible or solvent injection, and microbial methods.

Microbial Enhanced Oil Recovery (MEOR) is a multidisciplinary field incorporating, inter alia, geology, chemistry, microbiology, fluid mechanics, petroleum engineering, environmental engineering and chemical engineering. MEOR uses microorganisms and/or their metabolites to enhance the recovery of oil. The microbial methods used in MEOR can address well bore clean-up in order to remove mud and other debris blocking the channels where oil flows; well stimulation improves the flow of oil from the drainage area into the well bore; and enhanced water floods increase microbial activity by injecting selected microbes, and sometimes nutrients.

In MEOR, nutrients and suitable microbes, which preferably grow under the anaerobic reservoir conditions, are injected into the reservoir. Microbial by-products, which can include biosurfactants, biopolymers, acids, solvents, gases, and enzymes, for example, can modify the properties of the oil and the interactions between oil, water, and the porous media, alter the permeability of subterranean formations, and ultimately increase the mobility and recovery of oil.

Interest in microbial surfactants has been steadily increasing in recent years due to their diversity, environmentally friendly nature, possibility of large-scale production, selectivity, performance under extreme conditions, and potential applications in environmental protection. Microbially produced surfactants, i.e., biosurfactants, reduce the interfacial tension between water and oil and, therefore, a lower hydrostatic pressure is required to move the liquid entrapped in the pores to overcome the capillary effect. Secondly, biosurfactants contribute to the formation of micelles providing a physical mechanism to mobilize oil in a moving aqueous phase.

There is a continuing need for improved methods of oil recovery, particular methods that can be sustained for extended periods of time. This includes needs for improved methods of enhanced oil recovery, such as methods using, for example, microorganisms and/or their growth by-products. Biosurfactants enhance the emulsification of hydrocarbons, have the potential to solubilize hydrocarbon contaminants and increase their availability for microbial degradation. These compounds can also be used in enhanced oil recovery.

BRIEF SUMMARY OF THE INVENTION

In certain embodiments, the subject invention provides microbes, as well as substances, such as biosurfactants, solvents and/or enzymes, derived from these microbes and the fermentation broth in which they are produced. The subject invention also provides methods of using these microbes and their by-products in improved oil production.

Specifically, the subject invention provides cost-effective, environmentally-friendly approaches to enhancing oil recovery. Advantageously, these methods can be practiced over a wide range of temperatures, including from 20 to 70° C., and higher.

In some embodiments, the subject invention provides materials and methods for improving oil production by treating an oil-producing site, e.g., an oil-bearing formation or an oil well, with microorganisms and/or their growth by-products. In one embodiment, the subject invention can be useful for enhancing oil recovery from an oil well by, e.g., stimulating the flow of oil from the well while dissolving scale within the formation.

In some embodiments, the present invention utilizes yeast growth by-products, such as, for example, biosurfactants. Biosurfactants are useful in the oil and gas industry for their ability to enhance oil recovery. Biosurfactants can modify the properties of the oil and the interactions between oil, water, and the porous media in which oil and gas originate, thereby increasing the mobility, and consequently the recovery, of oil. Thus, the compositions and methods of the subject invention can increase recovery of crude oil and natural gas from oil and gas containing formations by dramatically reducing both the surface and interfacial tension between substances within the formations and by altering the wettability of formations.

In one embodiment, the subject invention provides yeast fermentation products for enhancing oil recovery from an oil-bearing formation. In one embodiment, the yeast fermentation product is obtained through cultivation of biosurfactant-producing yeast using processes ranging from small to large scale. The cultivation process can be, for example, submerged cultivation, solid state fermentation (SSF), and/or a combination thereof. In one embodiment, yeast products are cultivated using a simplified yeast fermentation technique, which reduces cultivation time by 50% and reduces carbon source supplementation.

The yeast fermentation product can be obtained via cultivation of a biochemical-producing yeast, such as, for example, *Pichia anomala* (*Wickerhamomyces anomalus*). The fermentation broth after 7 days of cultivation at 25-30° C. can contain the yeast cell suspension and, for example, 4 g/L or more of glycolipid biosurfactants.

The yeast fermentation product can also be obtained via cultivation of the biosurfactant-producing yeast, *Starmerella bombicola*. The fermentation broth after 5 days of cultivation at 25° C. can contain the yeast cell suspension and, for example, 150 g/L or more of glycolipid biosurfactants.

The yeast fermentation product can comprise the fermentation broth, separated from the yeast cells. In one embodiment, the biosurfactants or other growth by-products in the broth are further separated from the broth and purified.

In some embodiments, the subject invention utilizes strains of bacteria and by-products thereof. These by-products can include, for example, metabolites, polymers, biosurfactants, enzymes, organic acids, and solvents. In certain embodiments, the bacteria are strains of *Bacillus* that thrive in high salt environments, such as those often encountered at an oil extraction site. In certain embodiments, the bacteria are surfactant over-producing strains of *Bacillus*, meaning such strains are characterized by enhanced biosurfactant production compared to wild type *Bacillus* strains. In certain embodiments, the *Bacillus* strains have increased enzyme production.

In one embodiment, the microorganisms are strains of *Bacillus subtilis, Bacillus licheniformis*, and/or *Bacillus amyloliquefaciens*. In preferred embodiments, the bacteria are in spore form.

In some embodiments, the *Bacillus* strains are capable of thriving under low oxygen conditions, thereby facilitating growth under microaerophilic and anaerobic conditions. Under anaerobic conditions, nitrate salts can be added to replace oxygen as an electron acceptor to support microaerophilic and/or anaerobic respiration.

In one embodiment, the *Bacillus subtilis* strains are, for example, *B. subtilis* var. *locuses* strains B1 and B2, which are effective producers of the amphiphilic lipopeptide surfactin.

In one embodiment the subject invention provides a method for improving oil recovery by applying one or more microorganisms capable of producing useful biochemical byproducts to an oil-producing site, e.g., an oil-bearing formation and/or oil well. The method optionally includes adding nutrients and/or other agents to the site. In certain embodiments, the microorganisms are selected from strains of *Bacillus*, including, but not limited to, strains of *Bacillus subtilis, Bacillus licheniformis*, and *Bacillus amyloliquefaciens*. In preferred embodiments, the bacteria are in spore form.

The method may also comprise adding a yeast fermentation product, such as the fermentation broth resulting from cultivation of, e.g., *Starmerella bombicola* or *Wickerhamomyces anomalus*. In one embodiment, the yeast cells can be removed from the yeast fermentation product and only the broth containing biosurfactants and other cell exudates is applied. In one embodiment, the yeast fermentation product comprises biosurfactants that have been separated from the fermentation broth and purified.

The method may also comprise applying the microbes and/or microbial growth by-products with one or more alkaline compounds. The alkaline compound can be, for example, ammonium hydroxide.

In some embodiments, the method may also comprise applying the microbes and/or microbial growth by-products with one or more polymer compounds. The polymer compounds can be selected from biopolymers such as, for example, hydrogels, polysaccharides, xanthan gum, guar gum, and cellulose polymers.

In some embodiments, the method may also comprise applying the microbes and/or microbial growth by-products with one or more non-biological surfactants. The surfactants may be, for example, anionic, cationic, non-ionic or zwitterionic.

In one embodiment, the microbes and/or microbial growth by-products can be applied with one or more chelating agents for reducing, e.g., dissolving, scale that has accumulated within an oil-bearing formation. The chelating agents may be, for example, citric acid, EDTA, sodium citrate and/or a combination thereof.

In one embodiment, the microorganisms can germinate and grow in situ within an oil-bearing formation or oil well, and produce biosurfactants therein. Consequently, a high concentration of biosurfactants and biosurfactant-producing microorganisms at a treatment site (e.g., an oil well) can be achieved easily and continuously.

In some embodiments, the subject microbe-based products and methods can further be used for paraffin removal, liquefaction of solid asphaltene, and bioremediation of hydrocarbon-contaminated waters, soils and other sites. For such uses, the methods can further comprise adding solvents, such as isopropyl alcohol or ethanol, with the microbes and/or microbial growth by-products.

In one embodiment, the subject invention provides methods of producing a biosurfactant by cultivating a microbe strain of the subject invention under conditions appropriate for growth and biosurfactant production; and purifying the biosurfactant. The subject invention also provides methods of producing solvents, enzymes or other proteins by cultivating a microbe strain of the subject invention under conditions appropriate for growth and solvent, enzyme or protein expression; and purifying the solvent, enzyme or other protein.

The microbe-based products of the subject invention can be used in a variety of unique settings because of, for example, the ability to efficiently deliver fresh fermentation broth with active metabolites; a mixture of cells and fermentation broth; compositions with a high density of cells; microbe-based products on short-order; and microbe-based products in remote locations.

Advantageously, the present invention can be used without releasing large quantities of inorganic compounds into the environment. Additionally, the claimed compositions and methods utilize components that are biodegradable and toxicologically safe. Thus, the present invention can be used in oil and gas production (and other industries) as an environmentally-friendly treatment.

DETAILED DESCRIPTION

In certain embodiments, the subject invention provides microbes, as well as substances, such as biosurfactants, solvents and/or enzymes, derived from these microbes and the fermentation broth in which they are produced. The subject invention also provides methods of using these microbes and their by-products in improved oil production.

Specifically, the subject invention provides cost-effective, environmentally-friendly approaches to enhancing oil recovery. Advantageously, these methods can be practiced over a wide range of temperatures, including from 20 to 70° C., and higher.

In some embodiments, the subject invention provides materials and methods for improving oil production by treating an oil-producing site with microorganisms and/or their growth by-products. In one embodiment, the subject invention can be useful for enhancing oil recovery from an oil-bearing formation or an oil well by, e.g., stimulating the flow of oil from the formation or well while dissolving scale therein.

In some embodiments, the present invention utilizes yeast growth by-products, such as, for example, biosurfactants. Biosurfactants are useful in the oil and gas industry for their ability to enhance oil recovery. Biosurfactants can modify the properties of the oil and the interactions between oil, water, and the porous media in which oil and gas originate, thereby increasing the mobility, and consequently the recovery, of oil. Thus, the compositions and methods of the subject invention can increase recovery of crude oil and natural gas from oil and gas containing formations by dramatically reducing both the surface and interfacial tension between substances within the formations and by altering the wettability of formations.

In specific embodiments, the methods and compositions described herein utilize microorganisms to enhance recovery of oil. The microorganisms can improve the quantity and quality of oil recovered from oil reservoirs, including those that are considered "mature." Furthermore, the microorganisms can remove toxic substances from oil production sites.

In some embodiments, the subject invention provides materials and methods for improving oil production by treating an oil-producing site with microorganisms and/or their growth by-products. In one embodiment, the subject invention can be useful for enhancing oil recovery from an oil-bearing formation or an oil well by, e.g., stimulating the flow of oil from the well or formation.

In one embodiment the subject invention provides a method for improving oil recovery by applying one or more microorganisms capable of producing useful biochemical byproducts to an oil-producing site, e.g., an oil-bearing formation and/or oil well. The method optionally includes adding nutrients and/or other agents to the site. In certain embodiments, the microorganisms are selected from strains of *Bacillus*, including, but not limited to, strains of *Bacillus subtilis, Bacillus licheniformis*, and *Bacillus amyloliquefaciens*. In preferred embodiments, the bacteria are in spore form.

In certain embodiments, the bacteria are strains of *Bacillus* that thrive in high salt environments, such as those often encountered at an oil extraction site. In certain embodiments, the bacteria are surfactant over-producing strains of *Bacillus*, meaning such strains are characterized by enhanced biosurfactant production compared to wild type *Bacillus* strains. In certain embodiments, the *Bacillus* strains have increased enzyme production.

The method may also comprise adding yeast fermentation products, such as the fermentation broth resulting from cultivation of biochemical-producing yeasts, e.g., *Starmerella bombicola* or *Wickerhamomyces anomalus*. In one embodiment, the yeast fermentation product comprises purified biosurfactants produced by these yeasts.

The method may also comprise applying the microbes with one or more alkaline compounds, polymers, surfactants and/or chelating agents.

Selected Definitions

As used herein, reference to a "microbe-based composition" means a composition that comprises components that were produced as the result of the growth of microorganisms or other cell cultures. Thus, the microbe-based composition may comprise the microbes themselves and/or by-products of microbial growth. The microbes may be in a vegetative state, in spore form, in mycelial form, in any other form of propagule, or a mixture of these. The microbes may be planktonic or in a biofilm form, or a mixture of both. The by-products of growth may be, for example, metabolites (e.g., biosurfactants), cell membrane components, expressed proteins, and/or other cellular components. The microbes may be intact or lysed. The cells may be absent, or the cells may be present at, for example, a concentration of $1 \times 10^4$, $1 \times 10^5$, $1 \times 10^6$, $1 \times 10^7$, $1 \times 10^8$, $1 \times 10^9$, $1 \times 10^{10}$, or $1 \times 10^{11}$ or more cells or propagules per milliliter of the composition. As used herein, a propagule is any portion of a microorganism from which a new and/or mature organism can develop, including but not limited to, cells, conidia, cysts, spores (e.g., reproductive spores, endospores and exospores), mycelia, buds and seeds.

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers, such as plant hormones, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, "harvested" refers to removing some or all of the microbe-based composition from a growth vessel.

In some embodiments, the microbes used according to the subject invention are "surfactant over-producing." For example, the strain may produce at least 0.1-10 g/L, e.g., 0.5-1 g/L surfactant. For example, the bacteria produce at least 10%, 25%, 50%, 100%, 2-fold, 5-fold, 7.5 fold, 10-fold, 12-fold, 15-fold or more compared to other oil-recovery microbial strains. Specifically, *Bacillus subtilis* ATCC 39307 is used herein as a reference strain.

As used herein, an "isolated" or "purified" nucleic acid molecule, polynucleotide, polypeptide, protein or organic compound such as a small molecule (e.g., those described below), is substantially free of other compounds, such as cellular material, with which it is associated in nature. Reference to "isolated" in the context of a strain of microorganism means that the strain is removed from the environment in which it exists in nature. Thus, the isolated strain may exist as, for example, a biologically pure culture, or as spores (or other forms of the strain) in association with a carrier. A purified or isolated polynucleotide (ribonucleic acid (RNA) or deoxyribonucleic acid (DNA)) is free of the genes or sequences that flank it in its naturally-occurring state. A purified or isolated polypeptide is free of the amino acids or sequences that flank it in its naturally-occurring state.

In certain embodiments, purified compounds are at least 60% by weight (dry weight) the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

A "metabolite" refers to any substance produced by metabolism or a substance necessary for taking part in a particular metabolic process. A metabolite can be an organic compound that is a starting material (e.g., glucose), an intermediate (e.g., acetyl-CoA) in, or an end product (e.g., n-butanol) of metabolism. Examples of metabolites can include, but are not limited to, enzymes, toxins, acids, solvents, alcohols, proteins, carbohydrates, vitamins, minerals, microelements, amino acids, polymers, and surfactants.

By "modulate" is meant alter (increase or decrease). Such alterations are detected by standard art known methods such as those described herein.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

By "reduces" is meant a negative alteration of at least 1%, 5%, 10%, 25%, 50%, 75%, or 100%.

By "reference" is meant a standard or control condition.

By "salt-tolerant" is meant a microbial strain capable of growing in a sodium chloride concentration of fifteen (15) percent or greater. In a specific embodiment, "salt-tolerant" refers to the ability to grow in 150 g/L or more of NaCl.

As used herein, a "biofilm" is a complex aggregate of microorganisms, such as bacteria, wherein the cells adhere to each other. The cells in biofilms are physiologically distinct from planktonic cells of the same organism, which are single cells that can float or swim in liquid medium.

As used herein, "surfactant" refers to a compound that lowers the surface tension (or interfacial tension) between two liquids or between a liquid and a solid. Surfactants act as detergents, wetting agents, emulsifiers, foaming agents, and/or dispersants. A surfactant produced by microorganisms is referred to as a "biosurfactant."

As used herein, "oil production" refers to any and all operations involved in the extraction of hydrocarbons such as crude oil or natural gas from a formation through its eventual processing and use by consumers. Oil production can include, but is not limited to, drilling, pumping, recovery, transmission, processing, refining, transportation, and storage of hydrocarbons.

An "oil-producing site" refers to any environment or structure, whether naturally-occurring or man-made, wherein one or more aspects of hydrocarbon, oil and/or natural gas recovery occurs, including but not limited to, subterranean formations, oil and gas containing formations, wells and wellbores.

As used herein, "scale" refers to accumulations formed by, for example, deposits of precipitated mineral salts, which can arise as a result of, for example, changes in the pressure, composition and/or temperature of crude oil. Scales can result from precipitates of, for example, barium sulfate, calcium carbonate, strontium sulfate, calcium sulfate, sodium chloride, silicon dioxide, iron sulfide, iron oxides, iron carbonate, silicates, phosphates and oxides, or any of a number of compounds that are insoluble or mildly soluble in water.

As used herein, "improving oil recovery" includes enhancing recovery of oil and hydrocarbons, and means increasing the amount of hydrocarbons produced and/or increasing the rate at which they are produced, e.g., by stimulating the flow of oil from the well.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Unless specifically stated or obvious from context, as used herein, the term "or" is understood to be inclusive. Unless specifically stated or obvious from context, as used herein, the terms "a," "an" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

Any compositions or methods provided herein can be combined with one or more of any of the other compositions and methods provided herein.

Other features and advantages of the invention will be apparent from the following description of the preferred embodiments thereof, and from the claims. All references cited herein are hereby incorporated by reference.

Microbial Growth By-Products According to the Subject Invention

In preferred embodiments, a composition is provided for improving and/or enhancing oil recovery from an oil production site, wherein the composition comprises one or more microorganisms and/or growth by-products thereof. In specific embodiments, the microorganisms are capable of, and are used for, producing one or more biosurfactants.

Biosurfactants are a structurally diverse group of surface-active substances produced by microorganisms. Biosurfactants are biodegradable and can be easily and cheaply produced using selected organisms on renewable substrates. Most biosurfactant-producing organisms produce biosurfactants in response to the presence of hydrocarbon source (e.g. oils, sugar, glycerol, etc) in the growing media. Other media components such as concentration of iron can also affect biosurfactant production significantly.

All biosurfactants are amphiphiles. They consist of two parts: a polar (hydrophilic) moiety and non-polar (hydrophobic) group. Due to their amphiphilic structure, biosurfactants increase the surface area of hydrophobic water-insoluble substances, increase the water bioavailability of such substances, and change the properties of bacterial cell surfaces.

Biosurfactants accumulate at interfaces, thus reducing interfacial tension and leading to the formation of aggregated micellular structures in solution. The ability of biosurfactants to form pores and destabilize biological membranes permits their use as antibacterial, antifungal, and hemolytic agents. Combined with the characteristics of low toxicity and biodegradability, biosurfactants are advantageous for use in the oil and gas industry for a variety of applications. These applications include, but are not limited to, enhancement of crude oil recovery; reduction of oil viscosity; paraffin removal from rods, tubing, liners, and pumps; petroleum equipment corrosion prevention; fracturing fluids; reduction of $H_2S$ concentration in extracted crude oil; as well as tank, flowline and pipeline cleaning.

Safe, effective microbial bio-surfactants reduce the surface and interfacial tensions between the molecules of liquids, solids, and gases. As discussed herein, this activity can be highly advantageous in the context of oil recovery.

Biosurfactants produced according to the subject invention can be used for other, non-oil recovery purposes including, for example, cleaning pipes, reactors, and other machinery or surfaces.

Biosurfactants include low molecular weight glycolipids (GLs), lipopeptides (LPs), flavolipids (FLs), phospholipids, and high molecular weight polymers such as lipoproteins, lipopolysaccharide-protein complexes, and polysaccharide-protein-fatty acid complexes. The hydrocarbon chain of a fatty acid acts as the common lipophilic moiety of a bio-surfactant molecule, whereas the hydrophilic part is formed by ester or alcohol groups of neutral lipids, by the carboxylate group of fatty acids or amino acids (or peptides), organic acid in the case of flavolipids, or, in the case of glycolipids, by the carbohydrate.

In one embodiment, the microbial biosurfactants according to the subject invention include glycolipids such as rhamnolipids (RLP), sophorolipids (SLP), trehalose lipids or mannosylerythritol lipids (MEL).

In one embodiment, the microbial biosurfactant is a lipopeptide, such as, for example, surfactin or iturin A.

Microbial biosurfactants are produced by a variety of microorganisms such as bacteria, fungi, and yeasts. Exemplary biosurfactant-producing microorganisms include *Pseudomonas* species (*P. aeruginosa, P. putida, P. florescens, P. fragi, P. syringae*); *Pseudozyma* (*P. aphidis*) *Flavobacterium* spp.; *Pichia* spp. (*P. anomala, P. lynferdii, P. guilliermondii, P. sydowiorum*), *Bacillus* spp. (*B. subtilis, B. amyloliquefaciens, B. pumillus, B. cereus, B. licheniformis*); *Wickerhamomyces* spp. (*W. anomalus*), *Starmerella* spp. (*S. bombicola*), *Candida* spp. (*C. albicans, C. rugosa, C. tropicalis, C. lipolytica, C. torulopsis*); *Rhodococcus* spp.; *Arthrobacter* spp.; *Campylobacter* spp.; *Cornybacterium* spp. and so on. The biosurfactants may be obtained by fermentation processes known in the art.

Growth of Microbes According to the Subject Invention

The subject invention utilizes methods for cultivation of microorganisms and production of microbial metabolites and/or other by-products of microbial growth. The subject invention further utilizes cultivation processes that are suitable for cultivation of microorganisms and production of microbial metabolites on a desired scale. The microbial cultivation systems would typically use submerged culture fermentation; however, surface culture and hybrid systems can also be used. As used herein "fermentation" refers to growth of cells under controlled conditions. The growth could be aerobic or anaerobic.

In one embodiment, the subject invention provides materials and methods for the production of biomass (e.g. viable cellular material), extracellular metabolites (e.g. small molecules and excreted proteins), residual nutrients and/or intracellular components (e.g. enzymes and other proteins).

The microbe growth vessel used according to the subject invention can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g. measurement of cell number and growth phases). Alternatively, a daily sample may be taken from the vessel and subjected to enumeration by techniques known in the art, such as dilution plating technique. Dilution plating is a simple technique used to estimate the number of bacteria in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method of cultivation can provide oxygenation to the growing culture. One embodiment utilizes slow motion of air to remove low-oxygen containing air and introduce oxygenated air. The oxygenated air may be ambient air supplemented daily through mechanisms including impellers for mechanical agitation of the liquid, and air spargers for supplying bubbles of gas to the liquid for dissolution of oxygen into the liquid.

The method can further comprise supplementing the cultivation with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, propanol, butanol, pentanol, hexanol, isobutanol, and/or glycerol; fats and oils such as soybean oil, rice bran oil, olive oil, canola oil, coconut oil, corn oil, sesame oil, and/or linseed oil. These carbon sources may be used independently or in a combination of two or more.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included, e.g., L-Alanine.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, calcium carbonate, and/or sodium carbonate. These inorganic salts may be used independently or in a combination of two or more.

In some embodiments, the method for cultivation may further comprise adding additional acids and/or antimicrobials in the liquid medium before, and/or during the cultivation process. Antimicrobial agents or antibiotics can be used for protecting the culture against contamination. Additionally, antifoaming agents may also be added to prevent the formation and/or accumulation of foam when gas is produced during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

The method and equipment for cultivation of microorganisms and production of the microbial by-products can be performed in a batch, quasi-continuous, or continuous processes.

The microbes can be grown in planktonic form or as biofilm. In the case of biofilm, the vessel may have within it a substrate upon which the microbes can be grown in a biofilm state. The system may also have, for example, the capacity to apply stimuli (such as shear stress) that encourages and/or improves the biofilm growth characteristics.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control bacterial growth.

The biomass content of the fermentation broth may be, for example from 5 g/l to 180 g/l or more. In one embodiment, the solids content of the broth is from 10 g/l to 150 g/l.

In one embodiment, the subject invention further provides a method for producing microbial metabolites such as ethanol, lactic acid, beta-glucan, proteins, peptides, metabolic intermediates, polyunsaturated fatty acid, and lipids. The metabolite content produced by the method can be, for example, at least 20%, 30%, 40%, 50%, 60%, 70%, 80%, or 90%.

The microbial growth by-product produced by microorganisms of interest may be retained in the microorganisms or secreted into the liquid medium. In another embodiment, the method for producing microbial growth by product may further comprise steps of concentrating and purifying the microbial growth by-product of interest. In a further embodiment, the liquid medium may contain compounds that stabilize the activity of microbial growth by-product.

In one embodiment, all of the microbial cultivation composition is removed upon the completion of the cultivation (e.g., upon, for example, achieving a desired cell density, or density of a specified metabolite in the broth). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a cell-free broth or contain cells. In this manner, a quasi-continuous system is created.

Advantageously, the method does not require complicated equipment or high energy consumption. The microorganisms of interest can be cultivated at small or large scale on site and utilized, even being still-mixed with their media. Similarly, the microbial metabolites can also be produced at large quantities at the site of need.

Advantageously, the microbe-based products can be produced in remote locations. The microbe growth facilities may operate off the grid by utilizing, for example, solar, wind and/or hydroelectric power.

The microorganisms useful according to the systems and methods of the subject invention can be, for example, bacteria, yeast and/or fungi. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In one embodiment, the microorganisms are bacteria, including Gram-positive and Gram-negative bacteria. The bacteria can be endospore or exospore forming bacteria. The bacteria may be, for example *Agrobacterium radiobacter, Alcanivora borkumensis, Azobacter* (*A. vinelandii, A. chroococcum*), *Azospirillum brasiliensis, Bacillus* (e.g., *B. subtilis, B. lichcniformis, B. firmus, B. laterosporus, B. megaterium, B. amyloliquifaciens*), *Clostridium* (*C. butyricum, C. tyrobutyricum, C. acetobutyricum, Clostridium* NIPER 7, and *C. beijerinckii*), *Lactobacillus fermentum, Norcardia* sp., *Pseudomonas* (*P. chlororaphis* subsp. *aureofaciens* (*Kluyver*), *P. aeruginosa*), *Rhizobium, Rhodospirillum rubrum. Sphingomonas paucimobilis, Ralstonia eulropha, Serratia marcescens* and/or *Tsukamurella* sp.

In preferred embodiments, the microorganism is a strain of *Bacillus* selected from the species *B. subtilis, B. amyloliq-*

*uefaciens* and *B. licheniformis*. Even more preferably, the strain of *Bacillus* is in spore form.

In certain embodiments, the present invention utilizes *Bacillus subtilis* strains with enhanced biosurfactant production compared to wild type *Bacillus subtilis* as well as compared to other microbes used in oil recovery. In certain embodiments, the *Bacillus subtilis* strains have increased biopolymer, solvent and/or enzyme production. Such *Bacillus subtilis* have been termed members of the B series, including, but not limited to, B1, B2 and B3.

In one embodiment, the microorganism is *B. subtilis* var. *locuses* B1 or B2, which are effective producers of, for example, surfactin and other biosurfactants, as well as biopolymers. This specification incorporates by reference International Publication No. WO 2017/044953 A1 to the extent it is consistent with the teachings disclosed herein.

A culture of the *B. subtilis* B1 microbe has been deposited with the American Type Culture Collection (ATCC), 10801 University Blvd., Manassas, Va. 20110-2209 USA. The deposit has been assigned accession number ATCC No. PTA-123459 by the depository and was deposited on Aug. 30, 2016.

The vegetative cells of *Bacillus subtilis* strain B1 are rods that are 0.7 to 0.9 µm wide by 1.6 to 3.3 µm long and occur singly. It is motile, Gram positive and produces biopolymers on nutrient agar and potato dextrose agar. It also produces ellipsoidal spores centrally or paracentrally in unswollen sporangia. The size of mature spores is 0.8 to 1.0 µm wide by 1.6 to 1.9 µm long. Agar colonies are cream/beige in color, raised, mucous, circular, entire, smooth, shiny and 3.0 to 7.0 mm in diameter after 16 hours at 40° C. on nutrient agar plate. It is a facultative aerobe with a growth temperature range of 25-55° C., with optimal growth temperature at 35° C. It hydrolyzes starch, is positive on Voges-Proskauer test, can utilize citrate and can grow with 15% NaCl.

In certain embodiments, the *Bacillus subtilis* strains are salt tolerant. Salt tolerance can be with respect to any one or more of a variety of salts. For example, the salt can be a monovalent salt such as a sodium or potassium salt, e.g., NaCl or KCl, or a divalent salt such as a magnesium or calcium salt, e.g., $MgCl_2$ or $CaCl_2$, or a trivalent salt. Given geographic sites to be treated, zinc, bromium, iron, or lithium salts are present in the composition or site. In preferred embodiments, the bacteria described herein are tolerant to NaCl as well as others of the aforementioned salts and are, therefore, widely useful for oil recovery.

In some embodiments, the *Bacillus subtilis* strains are capable of thriving under low oxygen conditions. In some embodiments, the *Bacillus subtilis* strain is grown under microaerophilic or anaerobic conditions. Under microaerophilic and/or anaerobic conditions, nitrate salts can be added to replace oxygen as the electron acceptor to support the anaerobic respiration.

The B strain series of *Bacillus subtilis* produce more biosurfactant compared to reference strains of *Bacillus subtilis*. Furthermore, the *Bacillus subtilis* strains survive under high salt and anaerobic conditions better than other well-known strains. The strains are also capable of growing under anaerobic conditions. The *Bacillus subtilis* B series strains can also be used for producing enzymes that degrade or metabolize oil or other petroleum products.

In one embodiment, the subject methods can utilize products of the fermentation of yeasts or fungi. Yeast and fungus species suitable for use according to the current invention, include, for example, *Candida*, *Saccharomyces* (*S. cerevisiae*, *S. boulardii sequela*, *S. torula*), *Issatchenkia*, *Kluyveromyces*, *Pichia*, *Wickerhamomyces* (e.g., *W. anomalus*), *Starmerella* (e.g., *S. bombicola*), *Rhodotorula* (e.g., *R. glutinous* and *R. graminus*), *Mycorrhiza*, *Mortierella*, *Phycomyces*, *Blakeslea*, *Thraustochytrium*, *Phythium*, *Entomophthora*, *Aureobasidium pullulans*, *Pseudozyma aphidis*, *Aspergillus*, and/or *Rhizopus* spp.

In one embodiment, the yeast is a killer yeast. As used herein, "killer yeast" means a strain of yeast characterized by its secretion of toxic proteins or glycoproteins, to which the strain itself is immune. The exotoxins secreted by killer yeasts are capable of killing other strains of yeast, fungi, or bacteria. For example, microorganisms that can be controlled by killer yeast include *Fusarium* and other filamentous fungi. Such yeasts can include, but are not limited to, *Wickerhamomyces* (e.g., *W. anomalus*), *Pichia* (e.g., *P. anomala*, *P. guielliermondii*, *P. occidentalis*, *P. kudriavzevii*), *Hansenula*, *Saccharomyces*, *Hanseniaspora*, (e.g., *Huvarum*), *Ustilago* (e.g., *U. maydis*), *Debaryomyces hansenii*, *Candida*, *Cryptococcus*, *Kluyveromyces*, *Torulopsis*, *Williopsis*, *Zygosaccharomyces* (e.g., *Z. bailii*), and others.

In one embodiment, the yeast fermentation product can be obtained via cultivation of a biochemical-producing yeast, such as, for example, *Pichia anomala* (*Wickerhamomyces anomalus*). *Wickerhamomyces anomalus* is frequently associated with food and grain production and is an effective producer of various solvents, enzymes, toxins, as well as glycolipid biosurfactants, such as SLP. The fermentation broth after 7 days of cultivation at 25-30° C. can contain the yeast cell suspension and, for example, 4 g/L or more of glycolipid biosurfactants.

In one embodiment, the yeast fermentation product can also be obtained via cultivation of the biosurfactant-producing yeast, *Starmerella bombicola*. This species is an effective producer of glycolipid biosurfactants, such as SLP. The fermentation broth after 5 days of cultivation at 25° C. can contain the yeast cell suspension and, for example, 150 g/L or more of glycolipid biosurfactants.

In one embodiment, the yeast fermentation product can comprise the fermentation broth, separated from the yeast cells. In one embodiment, the biosurfactants or other growth by-products in the broth are further separated from the broth and purified.

Other microbial strains including, for example, other fungal strains capable of accumulating significant amounts of, for example, glycolipid or lipopeptide biosurfactants or other metabolites can be used in accordance with the subject invention. Other metabolites useful according to the present invention include mannoprotein, beta-glucan and others that have bio-emulsifying and surface/interfacial tension-reducing properties.

Preparation of Microbe-Based Products

One microbe-based product of the subject invention is simply the fermentation broth containing the microorganism and/or the microbial metabolites produced by the microorganism and/or any residual nutrients. The product of fermentation may be used directly without extraction or purification. If desired, extraction and purification can be easily achieved using standard extraction methods or techniques known to those skilled in the art.

The microorganisms in the microbe-based product may be in an active or inactive form. The microbe-based products may be used without further stabilization, preservation, and storage. Advantageously, direct usage of these microbe-based products preserves a high viability of the microorganisms, reduces the possibility of contamination from foreign agents and undesirable microorganisms, and maintains the activity of the by-products of microbial growth.

The microbes and/or broth resulting from the microbial growth can be removed from the growth vessel and transferred via, for example, piping for immediate use.

Advantageously, in accordance with the subject invention, the microbe-based product may comprise broth in which the microbes were grown. The product may be, for example, at least, by weight, 1%, 5%, 10%, 25%, 50%, 75%, or 100% broth. The amount of biomass in the product, by weight, may be, for example, anywhere from 0% to 100% inclusive of all percentages therebetween.

In other embodiments, the composition (microbes, broth, or microbes and broth) can be placed in containers of appropriate size, taking into consideration, for example, the intended use, the contemplated method of application, the size of the fermentation tank, and any mode of transportation from microbe growth facility to the location of use. Thus, the containers into which the microbe-based composition is placed may be, for example, from 1 gallon to 1,000 gallons or more. In certain embodiments the containers are 2 gallons, 5 gallons, 25 gallons, or larger.

Upon harvesting the microbe-based composition from the growth vessels, further components can be added as the harvested product is placed into containers and/or piped (or otherwise transported for use). The additives can be, for example, buffers, carriers, other microbe-based compositions produced at the same or different facility, viscosity modifiers, preservatives, nutrients for microbe growth, tracking agents, pesticides, and other ingredients specific for an intended use.

Up to, for example, 50 wt. % or more of additives may be added, as needed, for particular applications, such as, e.g., to vary the VOC levels, increase penetration of the mixture, decrease viscosity of the mixture, as couplers for solvent insolubles in the mixture, and to provide solvents. All additives should have a flash point greater than 100° F., preferably greater than 150° F. and more preferably 195° F. TCC to achieve a final product flash point greater than 200° F.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C. On the other hand, a biosurfactant composition can typically be stored at ambient temperatures.

Local Production of Microbe-Based Products

In preferred embodiments of the subject invention, a microbe growth facility produces fresh, high-density microorganisms and/or microbial growth by-products of interest on a desired scale. The microbe growth facility may be located at or near the site of application. The facility produces high-density microbe-based compositions in batch, quasi-continuous, or continuous cultivation.

In subject invention utilizes cultivation processes ranging from small (e.g., lab setting) to large (e.g., industrial setting) scales. These cultivation processes include, but not limited to, submerged cultivation/fermentation, solid state fermentation (SSF), and combination thereof.

The microbe growth facilities of the subject invention produces fresh, microbe-based compositions, comprising the microbes themselves, microbial metabolites, and/or other components of the broth in which the microbes are grown. If desired, the compositions can have a high density of vegetative cells or a mixture of vegetative cells, spores, mycelia, conidia, or other microbial propagules.

Advantageously, the subject microbe-based products can be tailored for use at a specified location. In one embodiment, the microbe growth facility is located on, or near, a site where the microbe-based products will be used. For example, the microbe growth facility may be less than 300, 250, 200, 150, 100, 75, 50, 25, 15, 10, 5, 3, or 1 mile from the location of use.

Because the microbe-based product is generated locally, on-site or near the site of application, without resort to the microorganism stabilization, preservation, storage and transportation processes of conventional microbial production, a much higher density of live microorganisms can be generated. Thus, a smaller volume of the microbe-based product is required for use in the on-site application. Furthermore, this allows for higher density microbial applications where necessary to achieve the desired efficacy.

Advantageously, this allows for a scaled-down bioreactor (e.g., smaller fermentation tank, and smaller supplies of starter material, nutrients, pH control agents, and de-foaming agents, etc.), which makes the system efficient and facilitates the portability of the product. Local generation of the microbe-based product also facilitates the inclusion of the growth broth in the product, thus eliminating the requirement for stabilizing cells or separating them from their culture broth. The broth can contain agents produced during the fermentation that are particularly well-suited for local use.

Locally-produced high density, robust cultures of microbes are more effective in the field than those that have undergone cell stabilization or have been sitting in the supply chain for some time. The microbe-based products of the subject invention are particularly advantageous compared to traditional products wherein cells, spores, mycelia, conidia or other microbial propagules have been separated from metabolites and nutrients present in the fermentation growth media. Reduced transportation times allow for the production and delivery of fresh batches of microbes and/or their metabolites at the time and volume as required by local demand.

Advantageously, these microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell-count product and the associated broth and metabolites in which the cells are originally grown.

The microbe growth facilities provide manufacturing versatility by the ability to tailor the microbe-based products to improve synergies with destination geographies. Advantageously, in preferred embodiments, the systems of the subject invention harness the power of naturally-occurring local microorganisms and their metabolic by-products to improve oil production. Local microbes can be identified based on, for example, salt tolerance, or ability to grow at high temperatures.

The cultivation time for the individual vessels may be, for example, from 1 to 7 days or longer. The cultivation product can be harvested in any of a number of different ways.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

Methods of Enhanced Oil Recovery

In some embodiments, the subject invention provides materials and methods for improving oil production by treating an oil-producing site, e.g., an oil-bearing formation or an oil well, with microorganisms and/or their growth by-products. In one embodiment, the subject invention can be useful for enhancing oil recovery from an oil well by, e.g., stimulating the flow of oil from the well while dissolving scale within the formation.

As used herein, "applying" a composition or product refers to contacting it with a target or site such that the composition or product can have an effect on that target or site. The effect can be due to, for example, microbial growth and/or the action of a biosurfactant or other growth by-product. For example, the microbe-based compositions or products can be injected into oil wells and/or the piping, casing, annulus, pumps, tanks, etc. associated with oil-producing sites and oil-bearing formations.

In one embodiment the subject invention provides a method for improving oil recovery by applying one or more microorganisms capable of producing useful biochemical byproducts to an oil producing site, e.g., an oil-bearing formation and/or oil well. The method optionally includes adding nutrients and/or other agents to the site. In preferred embodiments, the microorganism is a biosurfactant-producing species of bacteria.

In certain embodiments, the microorganisms are selected from strains of Bacillus, including, but not limited to, strains of Bacillus subtilis, Bacillus licheniformis, and Bacillus amyloliquefaciens. In preferred embodiments, the bacteria are in spore form.

In one embodiment, the method further comprises adding nutrients and/or germination enhancers to promote microbial germination and growth. For example, nutrients such as sources of carbon, nitrogen, magnesium, phosphorous and protein can be added. Germination enhancers, such as L-alanine and manganese, can also be added.

The method may also comprise adding a yeast fermentation product, such as the fermentation broth resulting from cultivation of, e.g., Starmerella bombicola or Wickerhamomyces anomalus. In one embodiment, the yeast is a biosurfactant-producing yeast. In one embodiment, the fermentation broth comprises the by-products of yeast growth, such as, for example, glycolipid biosurfactants and other metabolites.

In one embodiment, the yeast cells can be removed from the yeast fermentation product and only the broth containing biosurfactants and other metabolites is applied. In one embodiment, the yeast fermentation product comprises biosurfactants that have been separated from the fermentation broth and purified.

In certain embodiments, the yeast fermentation products of the subject invention have advantages over, for example, biosurfactants alone, including one or more of the following: high concentrations of mannoprotein as a part of a yeast cell wall's outer surface; the presence of beta-glucan in yeast cell walls; and the presence of biosurfactants and other metabolites (e.g., lactic acid, ethanol, ethyl acetate, etc.) in the culture.

The method may also comprise applying the microbes and/or microbial growth by-products with one or more alkaline compounds. The alkaline compound can be, for example, ammonium hydroxide.

In some embodiments, the method may also comprise applying the microbes and/or microbial growth by-products with one or more polymer compounds. The polymer compounds can be selected from biopolymers such as, for example, hydrogels, polysaccharides, xanthan gum, guar gum, and cellulose polymers.

In some embodiments, the method may also comprise applying the microbes and/or microbial growth by-products with one or more non-biological surfactants. The surfactants may be, for example, anionic, cationic, non-ionic or zwitterionic.

In one embodiment, the microbes and/or microbial growth by-products can be applied with one or more chelating agents for reducing, e.g., dissolving, scale that has accumulated within the oil-bearing formation. The chelating agents may be, for example, citric acid, EDTA, and/or sodium citrate.

In some embodiments, the subject microbe-based products and methods can further be used for paraffin removal, liquefaction of solid asphaltene, and bioremediation of hydrocarbon-contaminated waters, soils and other sites.

In one embodiment, the microbe-based products are applied to a working well, including the surrounding formation. In this embodiment, the product can be poured or injected down the casing side (back lines) of a well and allowing it to mix with the fluid that is already in the well. When enough fluid is present, the composition can then optionally be circulated by, for example, a pump for 24-72 hours, preferably 48-72 hours. Prior to circulating, the composition may be allowed to set for 8 to 24 hours, for example. The setting time, circulating time and dosage depend on the depth and size of the well. A basic initial dosage can be, but is not limited to, 20 gallons of composition, and at least about 5 gallons of composition per well on periodic basis, e.g. biweekly, monthly, bimonthly.

In one embodiment, the microorganisms can germinate and grow in situ and produce biosurfactants in the oil-producing site. Consequently, a high concentration of biosurfactants and biosurfactant-producing microorganisms at a treatment site (e.g., an oil well) can be achieved easily and continuously.

In one embodiment, it is desirable to introduce the composition, through perforations in the casing, into the surrounding oil-bearing formation. The composition may be forced into the surrounding formation by applied pressure or, if the composition is allowed to set at the bottom of the casing, the composition may seep into the formation without additional pressure. The composition permeates the formation, dissolving blockages in the formation to provide more efficient oil and gas recovery.

In additional embodiments, the composition of the subject invention may be applied directly to equipment. For example, prior to placing rods and casings into gas and/or oil wells, these parts may be sprayed with, or soaked in, the composition. The parts may also be dipped into tanks filled with the composition.

The composition may be introduced by means of injection pumps into off-shore gas or oil wells to enhance oil recovery. To treat the lines, from 1-500 gallons up to 1000 barrels, 10,000 barrels, or more, for example, of the composition can be applied to the composition at an injection rate of, for example, 1 to 20 gallons per minute, or 1 to 20 barrels per minute.

The subject treatment can be effective in a range of different geologic formations. For example, the subject invention can be useful in formations as deep as about 7,000 feet or deeper, and as shallow as about 1,500 feet or shallower. Additionally, the invention can be useful in formations having a range of porosity and/or permeability, for example from about 0.1% to about 20% or more. The invention can also be useful in formations having a wide range of temperatures, pH, and salinity.

In one embodiment, enhanced oil recovery is achieved through selective plugging, wherein fluid flow through the reservoir is shifted from the reservoir's high permeability zones to moderate or low permeability zones. Sweep efficiency can be increased by, for example, forcing injected water to pass through previously by-passed oil zones of the reservoir. The changes in flow pattern can be achieved by an increase in microbial cell mass within the reservoir by, for example, injecting microorganisms together with nutrients. The injected nutrient and microbes preferentially flow into the high permeability zones of the reservoir and as a result of cell growth, the biomass selectively plugs these zones to a greater extent than the moderate or low permeability zones. In one embodiment, the microbes are injected in spore form and germinate while inside the reservoir.

Enhanced Oil Recovery Via the Alkaline-Surfactant-Polymer (ASP) Method

In one embodiment, methods for enhancing oil recovery are provided, wherein a microbe-based product of the subject invention is applied to an oil production site in combination with one or more alkaline compounds, polymers, surfactants, or combinations thereof.

In surfactant flooding, by reducing the interfacial tension between the oil and the displacing water and also the interfacial tension between the oil and the rock interfaces, residual oil can be displaced and recovered.

In caustic flooding, the reaction of the alkaline compounds with the organic acids in the oil forms in situ natural surfactants that lower the oil-water interfacial tension.

In addition to surfactant and alkaline flooding, polymers are used to increase the viscosity of the displacing water to improve the oil swept efficiency.

ASP flooding is a combination process in which alkali, surfactant and polymer are injected. ASP involves the injection of a solution containing polymer, alkali and surfactant into a depleted or matured oilfield with the objective of achieving optimum chemistry at large injection volumes for minimum cost. The alkali-surfactant mixture forms an emulsion with the oil, which is then swept and displaced from the reservoir using a polymer drive. ASP flooding improves microscopic displacement efficiency by reducing the interfacial tension (IFT) between the water and oil through the addition of a surfactant to the water, while matching the oil and water mobility through the addition of polymer. Alkali is also added to the water to reduce adsorption of the surfactant onto the pore walls and to control the local salinity to ensure minimum IFT and alter the rock wettability.

Use of Microbes with Surfactants in Oil Recovery

In certain embodiments, the methods of recovering oil described herein utilize one or more microbes and/or microbial growth by-products (e.g., biosurfactants), combined with other compositions. In one embodiment, the other compositions are non-biological surfactants.

A surfactant (Surface Active Agent) molecule has two functional groups, namely a hydrophilic (water-soluble) or polar group and a hydrophobic (oil-soluble) or non-polar group. The hydrophobic group is usually a long hydrocarbon chain (C8-C18), which may or may not be branched, while the hydrophilic group is formed by moieties such as carboxylates, sulfates, sulfonates (anionic), alcohols, polyoxyethylenated chains (nonionic) and quaternary ammonium salts (cationic).

Surfactants work in ASP flooding to lower the interfacial tension (IFT) between trapped oil and brine, to aid mobilization and contribute to the formation of oil banks. IFT reduction lowers capillary forces and allows for the oil bank to flow more freely without renewed trapping. The selection of an appropriate surfactant for EOR purposes is based on the ability to reduce IFT between crude and brine, thermal stability, tolerance to salinity and hardness of brine, solubility in brine, phase behavior parameters, adsorption test under static and dynamic condition and displacement studies under reservoir conditions.

Surfactants according to the subject methods include, but are not limited to: anionic surfactants, ammonium lauryl sulfate, sodium lauryl sulfate (also called SDS, sodium dodecyl sulfate), alkyl-ether sulfates sodium laureth sulfate (also known as sodium lauryl ether sulfate (SLES)), sodium myreth sulfate; docusates, dioctyl sodium sulfosuccinate, perfluorooctanesulfonate (PFOS), perfluorobutanesulfonate, linear alkylbenzene sulfonates (LABs), alkyl-aryl ether phosphates, alkyl ether phosphate; carboxylates, alkyl carboxylates (soaps), sodium stearate, sodium lauroyl sarcosinate, carboxylate-based fluorosurfactants, perfluorononanoate, perfluorooctanoate; cationic surfactants, pH-dependent primary, secondary, or tertiary amines, octenidine dihydrochloride, permanently charged quaternary ammonium cations, alkyltrimethylammonium salts, cetyl trimethylammonium bromide (CTAB) (a.k.a. hexadecyl trimethyl ammonium bromide), cetyl trimethylammonium chloride (CTAC), cetylpyridinium chloride (CPC), benzalkonium chloride (BAC), benzethonium chloride (BZT), 5-Bromo-5-nitro-1,3-dioxane, dimethyldioctadecylammonium chloride, cetrimonium bromide, dioctadecyldi-methylammonium bromide (DODAB); zwitterionic (amphoteric) surfactants, sultaines CHAPS (3-[(3-Cholamidopropyl)dimethylammonio]-1-propanesulfonate), cocamidopropyl hydroxysultaine, betaines, cocamidopropyl betaine, phosphatidylserine, phosphatidylethanolamine, phosphatidylcholine, sphingomyelins, ethoxylate, long chain alcohols, fatty alcohols, cetyl alcohol, stearyl alcohol, cetostearyl alcohol, oleyl alcohol, polyoxyethylene glycol alkyl ethers (Brij): CH3-(CH2)10-16-O—C2H4)1-25-OH (octaethylene glycol monododecyl ether, pentaethylene glycol monododecyl ether), polyoxypropylene glycol alkyl ethers: CH3-(CH2)10-16-(O—C3H6)1-25-OH, glucoside alkyl ethers: CH3-(CH2)10-16-(O-Glucoside)1-3-OH (decyl glucoside, lauryl glucoside, octyl glucoside), polyoxyethylene glycol octylphenol ethers: C8H17-(C6H4)-(O—C2H4)1-25-OH (Triton X-100), polyoxyethylene glycol alkylphenol ethers: C9H19-(C6H4)-(O—C2H4)1-25-OH (nonoxynol-9), glycerol alkyl esters (glyceryl laurate), polyoxyethylene glycol sorbitan alkyl esters (polysorbate), sorbitan alkyl esters (spans), cocamide MEA, cocamide DEA, dodecyldimethylamine oxide, copolymers of polyethylene glycol and polypropylene glycol (poloxamers), and polyethoxylated tallow amine (POEA).

Anionic surfactants contain anionic functional groups at their head, such as sulfate, sulfonate, phosphate, and carboxylates. Prominent alkyl sulfates include ammonium lauryl sulfate, sodium lauryl sulfate (also called SDS, sodium dodecyl sulfate) and the related alkyl-ether sulfates sodium laureth sulfate, also known as sodium lauryl ether sulfate (SLES), and sodium myreth sulfate. Carboxylates are the most common surfactants and comprise the alkyl carboxylates (soaps), such as sodium stearate.

Surfactants with cationic head groups include: pH-dependent primary, secondary, or tertiary amines; octenidine dihydrochloride; permanently charged quaternary ammonium cations such as alkyltrimethylammonium salts: cetyl trimethylammonium bromide (CTAB) a.k.a. hexadecyl trimethyl ammonium bromide, cetyl trimethylammonium chloride (CTAC); cetylpyridinium chloride (CPC); benzalkonium chloride (BAC); benzethonium chloride (BZT); 5-Bromo-5-nitro-1,3-dioxane; dimethyldioctadecylammonium chloride; cetrimonium bromide; and dioctadecyldi-methylammonium bromide (DODAB).

Zwitterionic (amphoteric) surfactants have both cationic and anionic centers attached to the same molecule. The cationic part is based on primary, secondary, or tertiary amines or quaternary ammonium cations. The anionic part can be more variable and include sulfonates. The most common biological zwitterionic surfactants have a phosphate anion with an amine or ammonium, such as the phospholipids phosphatidylserine, phosphatidylethanolamine, phosphatidylcholine, and sphingomyelins.

A surfactant with a non-charged hydrophilic part, e.g. ethoxylate, is non-ionic. Many long chain alcohols exhibit some surfactant properties.

Use of Microbes with Polymers in Oil Recovery

The present invention provides for methods of enhanced oil recovery using one or more microbes and/or microbial growth by-products, combined with one or more polymer compounds. Polymer compounds used to recover oil in combination with the microbes of the present invention include but are not limited to: hydrogels, acrylic acid, acrylamide, polyacrylamide (PAM), hydrolyzed polyacrylamide (HPAM), polysaccharide, xanthan gum, guar gum, and cellulose polymer. In preferred embodiments, the polymer is a biopolymer selected from, for example, hydrogels, xanthan gum, guar gum, cellulose polymers, polysaccharides, and others.

The associative water-soluble polymer is a relatively new class of polymers that has recently been introduced for oilfield applications. These polymers consist of a hydrophilic long-chain backbone, with a small number of hydrophobic groups localized either randomly along the chain or at the chain ends. When these polymers are dissolved in water, hydrophobic groups aggregate to minimize their water exposure. The incorporated groups associate due the intramolecular hydrophobic interactions and the intermolecular hydrophobic interactions. The functional groups on these polymer are less sensitive to brine salinity compared to polyacrylamide, whose viscosity dramatically decreases with increasing salinity.

Polymer flooding may involve addition of polymer to the water of a water-flood to decrease its mobility. Polymers increase the viscosity of the aqueous phase as well as reduces water permeability due to mechanical entrapment, consequently resulting in more favorable mobility ratio. With a more viscous phase, the collected oil bank can be more easily moved through the reservoir and eventually into the producing well.

The polymers according to these embodiments can also be removed and/or degraded using the microbe-based composition of the subject invention once their function in the well is no longer needed.

In one embodiment, the subject invention provides a method for improving hydrocarbon recovery from a fracking well by applying to a drilling site the microbe-based composition comprising one or more strains of microorganisms. In certain embodiments, the polymers have built up inside the well after they have performed their desired function inside the well.

The microbes of the microbe-based composition and/or their growth byproducts can quickly digest polymers such as polylactic acid (PLA); thus, the method improves the ability to recover hydrocarbon resources by reducing the buildup of PLA and other resins within the fractures and wellbores of fracking wells once their utility has been exhausted. The method optionally includes adding nutrients and/or other agents to the site in order to promote microbial growth. The method further can include adding polymer-degrading enzymes to the site in order to enhance polymer degradation.

In one embodiment, the subject invention provides methods of recovering polymeric substances that remain in wells, including fracking wells, after their utility has been exhausted. For example, biosurfactants produced by methods and microorganisms of the present invention can reduce interfacial tension of fluids used for uplifting polymeric substances, such as PAM gel friction reducers. In another embodiment, the biosurfactants can be used to cleave PAM gel prior to uplifting.

Use of Microbes with Alkaline Compounds in Oil Recovery

The present invention provides for methods of enhanced oil recovery using one or more microbes and/or microbial growth by-products, combined with one or more alkaline compounds. Alkaline compounds used to recover oil in combination with the microbes of the present invention include but are not limited to ammonium hydroxide.

Alkali is a basic, ionic salt of an alkali metal or alkaline earth metal element. The use of alkali in a chemical flood offers several benefits including promoting crude oil emulsification, increasing aqueous-phase ionic strength leading to regulation of phase behavior of the injected surfactant, and lowering IFT to ultralow values in presence of surfactant.

Alkali can also reduce costs by limiting the amount of surfactant needed in two ways. First, alkali reduces surfactant adsorption by increasing the rock surface's negative charge density, making it preferentially water-wet. Second, alkali reacts with the acids in the crude oils to produce in situ soaps, which in turn broadens the optimal salinity range. The soap generated creates a microemulsion phase that can co-exist with oil and water, thus extending the three-phase region (or ultra-low IFT region).

Selection of alkali is guided by the type of formation, clay type and divalent cations. Common alkaline agents include sodium hydroxide (NaOH, or caustic soda), sodium carbonate ($Na_2CO_3$, or soda ash), sodium bicarbonate ($NaHCO_3$) and sodium metaborate ($NaBO_2$). Sodium hydroxide solutions have been reported to strongly interact with sandstone at elevated temperature (185° F.), resulting in sandstone weight loss and increased porosity. Caustic consumption resulting from NaOH dissolution of silicate minerals can be a significant and detrimental factor during field application. Anionic surfactants showed much smaller adsorption in the presence of $Na_2CO_3$ compared to NaOH. The hydroxide is not a potential determining ion for carbonate surfaces. Calcium and other divalent cations can cause precipitation of alkalis such as $Na_2CO_3$ unless soft brine is used. This is limitation of $Na_2CO_3$. The use of $NaBO_2$ as a replacement for $Na_2CO_3$ has been reported. This alkali gave pH values of about 11 at 1 wt % alkali concentration and generated soap for acidic crude oils. Another major advantage of $NaBO_2$ (sodium metaborate) species are their tolerance to divalent cations. In carbonate reservoirs sodium metaborate is used in place of other alkalis. If reservoir contains clays $NaHCO_3$ is preferred. $Na_2CO_3$ is the most commonly used alkali because it is inexpensive and transports better in porous media.

The preferred oil formations for alkaline flooding are sandstone reservoirs rather than carbonate formations that contain anhydrite (calcium sulfate) ($CaSO_4$) or gypsum (calcium sulfate dehydrate) ($CaSO_4.2H_2O$), which can consume large amounts of alkaline chemicals. Also, in carbonate reservoirs the calcium carbonate ($CaCO_3$) or calcium hydroxide ($Ca(OH)_2$) precipitation occurs when $Na_2CO_3$ or NaOH is added. Carbonate reservoirs also contain brine with a higher concentration of divalents and could cause precipitation. To overcome this problem, suggested $NaHCO_3$ and sodium sulfate ($Na_2SO_4$) is used. $NaHCO_3$ has a much lower carbonate ion concentration, and additional sulfate ions can decrease calcium ion concentration in the solution. These chemicals are also consumed by clays, minerals, or silica, and the higher the temperature of the reservoir the higher the alkali consumption. Another common problem during caustic flooding is scale formation in the producing wells. During alkaline flooding, the injection sequence usually includes: (1) a preflush to condition the reservoir before injection of the primary slug, (2) primary slug (alkaline chemicals), (3) polymer as a mobility buffer to displace the primary slug. Alkaline flooding can be modified as the AP (alkali-polymer), AS (alkali-surfactant), and Alkali-Surfactant-Polymer (ASP) processes. Soap produced from the reaction between the acidic components of a crude oil and the injected alkali is the principal mechanism of oil recovery in alkaline flooding.

Use of Microbes with Chelating Agents

In some embodiments, the microorganisms and/or growth by-products thereof can be applied with a chelator or chelating agent. Advantageously, the use of chelating agents aides in enhancing oil recovery by dissolving scale within a formation. Scale can block the pores and other flow paths of an oil-bearing formation, thus slowing and/or blocking the flow of oil from the formation.

As used herein, "chelator" or "chelating agent" means an active agent capable of removing a metal ion from a system by forming a complex so that the metal ion, for example, cannot readily participate in or catalyze oxygen radical formation.

Examples of chelating agents suitable for the present invention include, but are not limited to, dimercaptosuccinic acid (DMSA), 2,3-dimercaptopropanesulfonic acid (DMPS), alpha lipoic acid (ALA), thiamine tetrahydrofurfuryl disulfide (TTFD), penicillamine, ethylenediaminetetraacetic acid (EDTA), sodium acetate, sodium citrate and citric acid.

In preferred embodiments, the chelating agent is sodium citrate, citric acid, EDTA or a combination thereof.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1

Production of *Bacillus Subtilis*

Fermentation of *Bacillus subtilis* var. *lotuses* can be performed in a 500 L reactor with 350 L of a nutrient medium containing (g/L):

| Glucose | 18 |
| Powder molasses | 2 |
| Sucrose | 1 |
| $KH_2PO_4$ | 0.5 |
| $Na_2HPO_4 \cdot 7H_2O$ | 2.1 |
| KCl | 0.1 |
| $MgSO_4$ | 0.5 |
| $CaCl_2$ | 0.05 |
| Urea | 2.5 |
| $NH_4Cl$ | 1.24 |
| Yeast extract | 2 |
| Corn peptone | 0.5 |
| TekNova trace element (mL) | 1 |

Temperature of cultivation is 40° C., pH stabilization is from 6.8-7.0, and DO stabilization is at 20-30% (concentration of oxygen in the air is taken as 100%). Duration of cultivation is 24-36 hours, or until at least 95% of the bacteria reach sporulation. The final concentration of bacterial culture is no less than $1 \times 10^9$ CFU/ml. The amount of culture manufactured by a single fermentation cycle allows for the production of more than 2,000 barrels of final treatment formulation containing $10^6$ CFU of this strain of *Bacillus*.

Example 2

Fermentation of *Starmerella Bombicola* for Biosurfactant Production

The fermenter is an autoclavable stainless steel vessel designed specifically for cultivation of yeast and production of biosurfactants. The fermenter is fitted with a microsparger and an impeller, as well as with dissolved oxygen, pH, temperature and foam probes. It has an integrated control station with a color touchscreen interface, built-in pumps for enhanced mixture of broth, gas flow controllers, and pH/DO foam/level controllers. The working volume of the 550 gallon reactor is 500 gallons.

The nutrient medium contains sources of carbon, protein, nitrogen, and unsaturated oil or fatty acids. One-day old culture of *Starmerella bombicola* (60-70 L) is used to inoculate the reactor. Initial pH of the culture is 5.0-6.0 until growth of microbes occurs and pH begins to decline. Cultivation duration and readymade product collection continue for 5 days at 25° C. and pH is stabilized at 3.5. The final sophorolipid content can reach at least 40% of working volume per cycle, or 150 g/L or higher.

What is claimed:

1. A method for enhancing the amount of oil recoverable from an oil-bearing formation, wherein the method comprises:
  applying to the formation a yeast fermentation product comprising a broth in which a *Wickerhamomyces anomalus* or *Starmerella bombicola* yeast was cultivated, wherein said broth comprises a glycolipid biosurfactant produced by said yeast, and wherein said broth contains yeast cellular components but no living yeasts;
  wherein said method further comprises applying to the formation:
  a solvent selected from the group consisting of isopropyl alcohol and ethanol; and
  a chelating agent comprising a mixture of two or more of citric acid, sodium citrate, and EDTA.

2. The method of claim 1, further comprising administering one or more polymer compounds to the formation.

3. The method of claim 2, wherein the one or more polymer compounds are selected from the group consisting of xanthan gum, guar gum, hydrogels, polysaccharide, and cellulose polymers.

4. The method of claim 1, further comprising administering one or more non-biological surfactants to the formation.

5. The method of claim 1, wherein the method enhances oil recovery and also dissolves scale deposits present in the formation.

6. The method of claim 1, wherein the yeast fermentation product, the solvent and the chelating agent are mixed with water prior to application, and wherein the glycolipid biosurfactant is a sophorolipid and the solvent is isopropyl alcohol.

7. The method of claim 1, wherein the yeast is *Starmerella bombicola*.

\* \* \* \* \*